United States Patent
Qin

(10) Patent No.: US 11,512,148 B2
(45) Date of Patent: Nov. 29, 2022

(54) COMPOSITION INCLUDING MULTIPLE TERMINALLY FUNCTIONALIZED POLYMERS

(71) Applicant: Bridgestone Corporation, Chuo-ku (JP)

(72) Inventor: Zengquan Qin, Brentwood, TN (US)

(73) Assignee: Bridgestone Corporation, Chuo-ku (JP)

( * ) Notice: Subject to any disclaimer, the term of this patent is extended or adjusted under 35 U.S.C. 154(b) by 239 days.

(21) Appl. No.: 16/959,315

(22) PCT Filed: Dec. 26, 2018

(86) PCT No.: PCT/US2018/067537
§ 371 (c)(1),
(2) Date: Jun. 30, 2020

(87) PCT Pub. No.: WO2019/133633
PCT Pub. Date: Jul. 4, 2019

(65) Prior Publication Data
US 2020/0369791 A1 Nov. 26, 2020

Related U.S. Application Data

(60) Provisional application No. 62/612,386, filed on Dec. 30, 2017.

(51) Int. Cl.
*C08F 8/30* (2006.01)
*C08C 19/22* (2006.01)
*C08L 7/00* (2006.01)

(52) U.S. Cl.
CPC .......... *C08C 19/22* (2013.01); *C08L 7/00* (2013.01)

(58) Field of Classification Search
CPC . C08C 19/22; C08C 19/44; C08F 4/12; C08F 4/44; C08F 4/52; C08F 8/30; C08F 36/02; C08F 36/04; C08F 36/06; C08F 36/045; C08F 2810/40
See application file for complete search history.

(56) References Cited

U.S. PATENT DOCUMENTS

| | | |
|---|---|---|
| 3,297,667 A | 1/1967 | von Dohlen et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,533,711 A | 8/1985 | Takeuchi et al. |
| 4,575,538 A | 3/1986 | Hsieh et al. |
| 4,663,405 A | 5/1987 | Throckmorton |
| 4,696,984 A | 9/1987 | Carbonaro et al. |
| 4,710,553 A | 12/1987 | Carbonaro et al. |
| 4,736,001 A | 4/1988 | Carbonaro et al. |
| 4,906,706 A | 3/1990 | Hattori et al. |
| 4,990,573 A | 2/1991 | Andreussi et al. |
| 5,030,695 A | 7/1991 | Cozewith et al. |
| 5,064,910 A | 11/1991 | Hattori et al. |
| 5,153,271 A | 10/1992 | Lawson et al. |
| 5,567,784 A | 10/1996 | Wieder et al. |
| 6,255,416 B1 | 7/2001 | Sone et al. |
| 6,391,990 B1 | 5/2002 | Ishino et al. |
| 6,437,205 B1 | 8/2002 | Miller et al. |
| 6,482,930 B1 | 11/2002 | Kwag et al. |
| 6,521,726 B1 | 2/2003 | Kimura et al. |
| 6,897,270 B2 | 5/2005 | Ozawa et al. |
| 7,008,899 B2 | 3/2006 | Luo et al. |
| 7,094,849 B2 | 8/2006 | Luo et al. |
| 7,288,611 B2 | 10/2007 | Jiang et al. |
| 7,396,889 B2 | 7/2008 | Robert |
| 7,534,839 B2 * | 5/2009 | Lawson .................. C08C 19/44 525/332.9 |
| 7,741,418 B2 | 6/2010 | Luo et al. |
| 7,767,755 B2 * | 8/2010 | Yan ........................ C08L 15/00 524/612 |
| 7,825,201 B2 | 11/2010 | Luo et al. |

(Continued)

FOREIGN PATENT DOCUMENTS

JP 2016-160422 A 9/2016

OTHER PUBLICATIONS

Extended search report in EP appl. No. 18896904.2, dated Jul. 14, 2021.
Examination report in JP appl. No. 2020-536615, dated Sep. 7, 2021.
Z. Shen et al., "The Characteristics of Lanthanide Coordination Catalysts and the cis-Polydienes Prepared There-with," J. Polym. Sci.: Polym. Chem. Ed., vol. 18, pp. 3345-3357 (Feb. 1980; John Wiley & Sons, Inc.; New York, NY).
H.L. Hsieh et al., "Polymerization of Butadiene and Isoprene with Lanthanide Catalysts; Characterization and Properties of Homopolymers and Copolymers," Rubber Chem. & Tech., 1985, vol. 58, pp. 117-145 (presented at a May 1984 conference; American Chemical Society; Washington, D.C.).
R.P. Quirk et al., "Butadiene polymerization using neodymium versatate-based catalysts: catalyst optimization and effects of water and excess versatic acid," Polymer, 2000, 41, pp. 5903-5908 (Elsevier Science Ltd.; London, UK).

(Continued)

*Primary Examiner* — Robert C Boyle
(74) *Attorney, Agent, or Firm* — Meredith E. Hooker; Nathan T. Lewis

(57) ABSTRACT

Vulcanizates with desirable properties such as reduced hysteresis and improved wear resistance can be obtained from a composition that includes particulate filler(s) and at least two types of terminally functionalized polymers. One type of polymer has a heterocyclic moiety at a terminus, while another type has at one of its termini an aryl group that includes at least two hydroxyl substituents. The functionalized polymers are provided by reacting terminally active polymers with, respectively, a heterocyclic nitrile and a compound that includes an aryl group having at least two directly bonded $OG_p$ substituents, where $G_p$ is a protecting group, and a substituent that can react with the active terminus. The protecting groups can be removed so as to provide a terminal moiety that includes an aryl group having at least two directly bonded hydroxyl groups.

20 Claims, No Drawings

(56) References Cited

U.S. PATENT DOCUMENTS

| | | | |
|---|---|---|---|
| 7,902,309 B2 | 3/2011 | Luo et al. | |
| 8,314,189 B2* | 11/2012 | Luo | C08L 15/00 |
| | | | 526/236 |
| 8,729,167 B2 | 5/2014 | Thiele et al. | |
| 8,765,888 B2 | 7/2014 | Qin et al. | |
| 8,871,871 B2 | 10/2014 | Pan et al. | |
| 8,946,355 B2* | 2/2015 | Yan | C08F 236/10 |
| | | | 525/333.6 |
| 9,447,213 B2 | 9/2016 | Luo | |
| 9,447,255 B2 | 9/2016 | Tsuji | |
| 2009/0203826 A1 | 8/2009 | Rachita et al. | |
| 2014/0187693 A1* | 7/2014 | Tsuji | C08K 3/04 |
| | | | 524/186 |
| 2016/0264689 A1 | 9/2016 | Blok et al. | |
| 2017/0275400 A1* | 9/2017 | Hirata | C08C 19/00 |
| 2019/0161571 A1 | 5/2019 | Yamagata et al. | |

OTHER PUBLICATIONS

L. Friebe et al., "Neodymium Based Ziegler-Natta Catalysts and their Application in Diene Polymerization," Neodymium-Based Ziegler Catalysts—Fundamental Chemistry, Advances in Polymer Science, Jul. 2006, 204, pp. 1-154 (Springer-Verlag GmbH; Berlin, Germany).

Z. Zhang et al., "Polymerization of 1,3-Conjugated Dienes with Rare-Earth Metal Precursors," Struct Bond, 2010, 137, pp. 49-108 (Springer-Verlag GmbH; Berlin, Germany).

M. Yu et al., Role of L-3,4-Dihydroxyphenylalanine in Mussel Adhesive Proteins, J. Am. Chem. Soc. 1999, 121, pp. 5825-5826 (American Chemical Society; Washington, D.C.).

H. Lee et al., "Single-molecule mechanics of mussel adhesion," PNAS, vol. 103, No. 35, 2006, pp. 12999-13003 (National Academy of Sciences; Washington, D.C.).

S.K.H. Thiele et al., "Development of functionalized high-cis polybutadiene rubber for the rolling resistance reduction of tires," Rubber World, Feb. 2016, vol. 253, No. 5, pp. 37-41 (Lippincott & Peto Inc.; Akron, Ohio).

S. Reshmi et al., "Azide and Alkyne Terminated Polybutadiene Binders: Synthesis, Cross-linking, and Propellant Studies," Ind. Eng. Chem. Res., 2014, 53, pp. 16612-16620 (American Chemical Society; Washington, D.C.).

* cited by examiner

COMPOSITION INCLUDING MULTIPLE TERMINALLY FUNCTIONALIZED POLYMERS

CROSS-REFERENCE TO RELATED APPLICATIONS

This application is a national stage entry of international application no. PCT/US2018/067537, filed 26 Dec. 2018, which claims the benefit of U.S. provisional patent application No. 62/612,386, filed 30 Dec. 2017, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Of the various elastomeric materials used in the manufacture of vulcanizates such as, e.g., tire components, some of the most common are natural rubber, high-cis polybutadiene (often made by processes employing catalysts), and substantially random styrene/butadiene interpolymers (often made by processes employing anionic initiators). Functionalities that can be provided at the termini of anionically initiated styrene/butadiene interpolymers (which are carbanionic and, therefore, highly reactive) often cannot be provided to the termini of so-called pseudo-living polymers made via coordination (e.g., Ziegler-Natta) catalysis, e.g., high-cis polybutadiene. (Polymers prepared using coordination catalyst compositions often are considered to display pseudo-living characteristics.) Despite years of experience with both types of polymers, elastomer manufacturers cannot predict whether a compound that will react with the terminus of a carbanionic polymer likewise will react with the terminus of a pseudo-living polymer.

The termini of carbanionic polymers often are functionalized by reaction with more than one type of compound. These functionalization reactions can occur simultaneously (i.e., by addition of both types of compounds to the polymer cement at the same time), sequentially so as to provide multiple functional groups on the same polymer chain, i.e., dual functionalization (see, e.g., U.S. Pat. No. 7,534,839), or sequentially in a less-than-stoichiometric manner so as to provide a mixture of differently functionalized polymers (see, e.g., U.S. Pat. No. 7,767,755). The goal of such mixed functionalization typically to enhance interactivity with two different types of particulate filler, for example, both carbon black and silica.

Such mixed functionalization with coordination catalyzed (pseudo-living) polymers is far less common, although not unknown. For example, U.S. Pat. No. 8,314,189 teaches functionalization of pseudo-living polymers with a heterocyclic nitrile such as 2-cyano-pyridine (2-pyridinecarbonitrile), leaving open the possibility of the use of so-called co-functionalizing agents including silanes, tin compounds (e.g., dioctyltin bis(octylmaleate), and silicon compounds (e.g., $SiCl_4$).

SUMMARY

Vulcanizates with desirable properties (e.g., reduced hysteresis and improved wear resistance) can be obtained from a composition that includes particulate filler(s) and at least two types of terminally functionalized polymers. One type of polymer has a heterocyclic moiety at a terminus, while another type has at one of its termini an aryl group that includes at least two hydroxyl substituents.

Both types of polymers are provided via a process involving coordination catalysis and are accordingly considered to be pseudo-living. Some of the polymer chains react with a heterocyclic nitrile, while other polymer chains react with a compound that includes an aryl group having at least two directly bonded $OG_p$ substituents, where $G_p$ is a protecting group, and a substituent that can react with an active terminus of the polymer. The protecting group can be removed in a separate de-protection step or often during normal compounding and processing so as to provide terminal functionality that includes an aryl group having at least two directly bonded hydroxyl groups.

Using a phenyl group as an exemplary aryl group, the compound can have the general formula

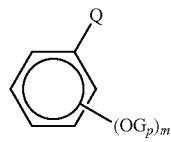

(I)

where $G_p$ is defined as above; m is an integer of from 2 to 5 inclusive; and Q is a group that is reactive toward the active termini of pseudo-living polymers. (Where the aryl group is other than a phenyl group, m can be greater than 5, up to the number of available bonding spots around the C atoms of the aryl group.)

A mixture of functionalized polymers can be provided by allowing reactive polymers (i.e., polymers provided via coordination catalysis and having pseudo-living (active) termini) to react with (1) a heterocyclic nitrile or (2) a compound that includes an aryl group having at least two directly bonded $OG_p$ substituents and a substituent that can react with the terminus of a pseudo-living polymer. Reaction of some polymer chains with the heterocyclic compound and other chains with the other compound result in a mixture from which can be provided vulcanizates having a combination of desirable properties.

The reaction of the polymer chains with each class of compounds can occur simultaneously or sequentially, in either order. (Sequential reactions employ a less-than-stoichiometric amount of the first-added type of compound so as to leave available some percentage of reactive polymer chains for reaction with the later-added type. Dual functionalization of the type mentioned above is not envisioned here.) Alternatively but less preferably, the two types of polymers can be prepared separately and blended, either before or simultaneously with introduction of particulate filler.

In one aspect is provided a method involving provision of a solution that includes a catalyst composition and one or more types of ethylenically unsaturated monomers which include at least one type of polyene, with the catalyst composition being allowed to catalyze polymerization of the monomers so as to provide a pseudo-living polymer. The active termini of some of the resulting polymers can react with the Q substituent of a formula (I)-type compound so as to provide a polymer having as a terminal functionality the radical of a compound that includes an aryl group having at least two directly bonded $OG_p$ substituents, while the active termini of others of the resulting polymers can react with the cyanate group of the heterocyclic nitrile.

The protecting groups can be replaced, typically via hydrolysis, with hydrogen atoms so as to provide one or more hydroxyl substituents directly bonded to the aryl group. Where the aryl group is a phenyl group, this can result in from 2 to 5 hydroxyl substituents being directly bonded to the phenyl group. (The number of hydroxyl substituents can be greater than 5 where the aryl group is other than a phenyl group.)

The terminally active polymers typically include one or more types of polyene mer, particularly conjugated diene mer, thereby providing unsaturation within and/or pendent from the polymer chain.

Regardless of how characterized, the polymer can interact with particulate filler such as, e.g., carbon black and silica. Compositions, including vulcanizates, that include particulate fillers and such polymers also are provided, as are methods of providing and using such compositions.

Other aspects of the present invention will be apparent to the ordinarily skilled artisan from the description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"aryl" means phenyl or polycyclic aromatic;

"radical" means that portion of a molecule which remains after reacting with another molecule, regardless of whether any atoms are gained or lost as a result of the reaction;

"directly bonded" means covalently attached with no intervening or interposed atoms or groups;

"indirectly bonded" means covalent attachment of two moieties or substituents to separate ends or portions of a connecting or interposed radical;

"heterocyclic nitrile" means a compound in which at least one cyano (nitrile) group is directly or indirectly bonded to a heterocyclic group;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"catalyst composition" encompasses a simple mixture of ingredients, a complex of various ingredients that is caused by physical or chemical forces of attraction, a chemical reaction product of some or all of the ingredients, or a combination of the foregoing, the result of which is a composition displaying catalytic activity with respect to one or more types of ethylenically unsaturated monomers;

"gum Mooney viscosity" is the Mooney viscosity of an uncured polymer prior to addition of any filler(s);

"non-coordinating anion" means a sterically bulky anion that does not form coordinate bonds with the active center of a catalyst system due to steric hindrance;

"non-coordinating anion precursor" means a compound that is able to form a non-coordinating anion under reaction conditions;

"substituted" means one containing a heteroatom or functionality (e.g., hydrocarbyl group) that does not interfere with the intended purpose of the group in question;

"protecting group" means a group that (1) is sufficiently reactive toward the oxygen atom of a hydroxyl functionality that, under a first set of reaction conditions, it can replace the H atom of that group, (2) is non-reactive toward carbanionic polymers and the initiators used to provide them, and, optionally, (3) can be replaced by a H atom under a second set of reaction conditions which differ from the first set;

"terminus" means an end of a polymeric chain;

"terminally active polymer" means a reactive polymer where the active site(s) is or are at a terminus; and "terminal moiety" means a group or functionality located at a terminus.

DESCRIPTION OF ILLUSTRATIVE EMBODIMENTS

Functionalized polymers of the type described in the preceding Summary, which can be characterized or defined in a variety of ways, generally are provided by introducing (1) a general formula (I)-type compound and (2) a heterocyclic nitrile to one or more types of reactive polymers. The introduction of the functionalizing compounds can occur simultaneously, sequentially, or separately.

One of more of the polymers of the composition can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Exemplary elastomers include homopolymers of one type of polyene and inter-polymers of multiple types of polyenes.

Polyenes can incorporate into polymeric chains in more than one way. Especially for rubber compositions intended for tire tread applications, controlling this manner of polyene incorporation (i.e., microstructure) can be desirable. (Microstructure can be determined by, for example, IR spectroscopy and/or proton or $^{13}C$ NMR.) Polymers that include polyene (particularly conjugated diene) mer incorporated primarily in a high cis-1,4-linkage manner (e.g., at least ~60%, at least ~75%, at least ~90%, and even at least ~95%) usually are prepared by processes using catalysts as opposed to the initiators employed in anionic polymerizations.

Such polymers can be made by any of a variety of polymerization techniques. Solution polymerization generally affords a higher degree of control with respect to such properties as randomness, microstructure, etc. Useful polymerization solvents include various $C_5$-$C_{12}$ cyclic and acyclic alkanes as well as their alkylated derivatives, certain liquid aromatic compounds, and mixtures thereof; the ordinarily skilled artisan is aware of other useful solvent options and combinations. Solution polymerizations have been performed since about the mid-20th century, so the general aspects thereof are known to the ordinarily skilled artisan; nevertheless, certain aspects are provided here for convenience of reference. The particular conditions of the solution polymerization can vary significantly depending on the nature of the polymer desired.

Certain types of catalyst systems are known to be useful in producing very stereo-specific 1,4-polydienes from conjugated diene monomers. Some catalyst systems preferentially result in cis-1,4-polydienes, while others preferentially provide trans-1,4-polydienes, and the ordinarily skilled artisan is familiar with examples of each type. The following description is based on a particular cis-specific catalyst system, although this merely is for sake of exemplification and is not considered to be limiting to the functionalizing method and compounds. Other types of catalyst systems, including those based on other types of metals (e.g., Ni, Co, Ti, etc.), also are believed to be capable of use; for additional information, the interested reader is directed to, e.g., U.S. Pat. Nos. 3,856,764, 3,910,869, 3,962,375, 5,811,499 and 6,596,825, as well as subsequent patent documents citing these.

Exemplary catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes. Exemplary lanthanide catalyst compositions include (a) a lanthanide compound, an alkylating agent and a halogen-containing compound (although use of a halogen-containing compound is optional when the lanthanide compound and/or the alkylating agent contains a halogen atom); (b) a lanthanide compound and an aluminoxane; or (c) a lanthanide compound, an alkylating agent, and a non-coordinating anion or precursor thereof.

Various lanthanide compounds or mixtures thereof can be employed, with preference given to those which are soluble in aromatic, aliphatic, and/or cycloaliphatic liquids, although hydrocarbon-insoluble lanthanide compounds can be suspended in the polymerization medium. Preferred lanthanide compounds include those which include at least one Nd, La, or Sm atom or those including didymium. The lanthanide atom(s) in the lanthanide compounds can be in any of a number of oxidation states, although the +3 oxidation state is most common. Exemplary lanthanide compounds include carboxylates, organophosphates, organophosphonates, organophosphinates, xanthates, carbamates, dithiocarbamates, β-diketonates, alkoxides, aryloxides, halides, pseudo-halides, oxyhalides, etc.

Typically, the lanthanide compound is used in conjunction with one or more alkylating agents, i.e., organometallic compounds that can transfer hydrocarbyl groups to another metal. These agents typically are organometallic compounds of electropositive metals such as Groups 1, 2, and 3 metals. Exemplary alkylating agents include organoaluminum compounds and organomagnesium compounds. The former include (1) compounds having the general formula $AlR^2{}_nX'_{3-n}$ where n is an integer of from 1 to 3 inclusive, each $R^2$ independently is a monovalent organic group (which may contain heteroatoms such as N, O, B, Si, S, P, and the like) connected to the Al atom via a C atom and each X' independently is a hydrogen atom, a halogen atom, a carboxylate group, an alkoxide group, or an aryloxide group; and (2) oligomeric linear or cyclic aluminoxanes, which can be made by reacting trihydrocarbylaluminum compounds with water. The latter include compounds having the general formula $MgR^3{}_yX'_{2-y}$ where X' is defined as above, y is an integer of from 1 to 2 inclusive, and $R^3$ is the same as $R^2$ except that each monovalent organic group is connected to the Mg atom via a C atom.

Some catalyst compositions contain compounds with one or more labile halogen atoms. Useful halogen-containing compounds include elemental halogens, mixed halogens, hydrogen halides, organic halides, inorganic halides, metallic halides, organometallic halides, and mixtures thereof. The halogen-containing compounds preferably are soluble in solvents such as those described above with respect to lanthanide compounds, although hydrocarbon-insoluble compounds can be suspended in the polymerization medium.

Other catalyst compositions contain a non-coordinating anion or a non-coordinating anion precursor. Exemplary non-coordinating anions include tetraarylborate anions, particularly fluorinated tetraarylborate anions, and ionic compounds containing non-coordinating anions and a counter-cation (e.g., triphenylcarbonium tetrakis (pentafluorophenyl)-borate). Exemplary non-coordinating anion precursors include boron compounds that include strong electron-withdrawing groups.

Catalyst compositions of this type have very high catalytic activity for polymerizing conjugated dienes into stereospecific polydienes over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for any one ingredient can depend on the concentrations of the other ingredients. The following molar ratios are considered to be relatively exemplary for a variety of different systems based on the foregoing ingredients:

alkylating agent to lanthanide compound (alkylating agent/Ln): from ~1:1 to ~200:1, preferably from ~2:1 to ~100:1, more preferably from ~5:1 to ~50:1;

halogen-containing compound to lanthanide compound (halogen atom/Ln): from ~1:2 to ~20:1, preferably from ~1:1 to ~10:1, more preferably from ~2:1 to ~6:1;

aluminoxane to lanthanide compound, specifically equivalents of aluminum atoms on the aluminoxane to equivalents of lanthanide atoms in the lanthanide compound (Al/Ln): from ~10:1 to ~50,000:1, preferably from ~50:1 to ~30,000:1, more preferably from ~75:1 to ~1,000:1; and non-coordinating anion or precursor to lanthanide compound (An/Ln): from ~1:2 to ~20:1, preferably from ~3:4 to ~10:1, more preferably from ~1:1 to ~6:1.

The molecular weight of a polydiene produced with a lanthanide-based catalyst can be controlled by adjusting the amount of catalyst and/or the amounts of co-catalyst concentrations within the catalyst system. In general, increasing the catalyst and co-catalyst concentrations reduces the molecular weight of resulting polydienes, although very low molecular weight polydienes (e.g., liquid polydienes) require extremely high catalyst concentrations which necessitates removal of catalyst residues from the polymer to avoid adverse effects such as retardation of the sulfur cure rate. Including one or more Ni-containing compounds to lanthanide-based catalyst compositions advantageously permits easy regulation of the molecular weight of the resulting polydiene without significant negative effects on catalyst activity and polymer microstructure. Various Ni-containing compounds or mixtures thereof can be employed, with preference given to those which are soluble in hydrocarbon solvents such as those set forth above.

The Ni atom in the Ni-containing compounds can be in any of a number of oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudohalides, oxyhalides, organonickel compounds (i.e., compounds containing at least one C—Ni bond such as, for example, nickelocene, decamethyl-nickelocene, etc.), and the like.

The molar ratio of the Ni-containing compound to the lanthanide compound (Ni/Ln) generally ranges from ~1:1000 to ~1:1, preferably from ~1:200 to ~1:2, and more preferably from ~1:100 to ~1:5.

These types of catalyst compositions can be formed using any of the following methods:
(1) In situ. The catalyst ingredients are added to a solution containing monomer and solvent (or simply bulk monomer). The addition can occur in a stepwise or simultaneous manner. In the case of the latter, the alkylating agent preferably is added first followed by, in order, the lanthanide compound, the nickel-containing compound (if used), and (if used) the halogen-containing compound or the non-coordinating anion or non-coordinating anion precursor.
(2) Pre-mixed. The ingredients can be mixed outside the polymerization system, generally at a temperature of from about −20° to ~80° C., before being introduced to the conjugated diene monomer(s).
(3) Pre-formed in the presence of monomer(s). The catalyst ingredients are mixed in the presence of a small amount of conjugated diene monomer(s) at a temperature of from about −20° to ~80° C. The amount of conjugated diene monomer can range from ~1 to ~500 moles, preferably from ~5 to ~250 moles, and more preferably from ~10 to ~100 moles, per mole of the lanthanide compound. The resulting catalyst composition is added to the remainder of the conjugated diene monomer(s) to be polymerized.
(4) Two-stage procedure.
  (a) The alkylating agent is combined with the lanthanide compound in the absence of conjugated diene monomer, or in the presence of a small amount of conjugated diene monomer, at a temperature of from about −20° to ~80° C.
  (b) The foregoing mixture and the remaining components are charged in either a stepwise or simultaneous manner to the remainder of the conjugated diene monomer(s) to be polymerized.
  (The Ni-containing compound, if used, can be included in either stage.)

When a solution of one or more of the catalyst ingredients is prepared outside the polymerization system in the foregoing methods, an organic solvent or carrier is preferably employed. Useful organic solvents include those mentioned previously.

The production of cis-1,4-polydiene is accomplished by polymerizing conjugated diene monomer in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.03 to ~0.5 mmol per 100 g conjugated diene monomer. All other ingredients generally are added in amounts that are based on the amount of lanthanide compound (see the various ratios set forth previously).

Polymerization preferably is carried out in an organic solvent, i.e., as a solution or precipitation polymerization where the monomer is in a condensed phase. Useful polymerization solvents include various $C_5$-$C_{12}$ cyclic and acyclic alkanes as well as their alkylated derivatives, certain liquid aromatic compounds, and mixtures thereof; the ordinarily skilled artisan is aware of other useful solvent options and combinations. The catalyst ingredients preferably are solubilized or suspended within the organic liquid. The amount (wt. %) of monomer present in the polymerization medium at the beginning of the polymerization generally ranges from ~3 to ~80%, preferably ~5 to ~50%, and more preferably ~10% to ~30%. (Polymerization also can be carried out by means of bulk polymerization conducted either in a condensed liquid phase or in a gas phase.)

Regardless of whether a batch, continuous, or semi-continuous process is employed, the polymerization preferably is conducted with moderate to vigorous agitation under anaerobic conditions provided by an inert protective gas. The polymerization temperature may vary widely, although typically a temperature of from ~20° to ~90° C. is employed; heat can be removed by external cooling and/or cooling by evaporation of the monomer or the solvent. The polymerization pressure employed may vary widely, although typically a pressure of from about 0.1 to about 1 MPa is employed.

Resulting polydienes advantageously can have a cis-1,4-linkage content of at least ~60%, at least ~75%, at least ~90%, and even at least ~95%, and a 1,2-linkage content of less than ~7%, less than ~5%, less than ~2%, and even less than ~1%.

Where 1,3-butadiene is polymerized, the cis-1,4-polybutadiene generally has a number average molecular weight ($M_n$), as determined by GPC using polybutadiene standards and Mark-Houwink constants for the polymer in question, of from ~5000 to ~200,000 Daltons, from ~25,000 to ~150,000

Daltons, or from ~50,000 to ~125,000 Daltons. The polydispersity of the polymers generally ranges from ~1.5 to ~5.0, typically from ~2.0 to ~4.0.

The $M_n$ of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

At this point, the reaction mixture commonly is referred to as a "polymer cement" because of its relatively high concentration of polymer. Many of the polymer chains in this mixture possess active (pseudo-living) ends. The percentage of polymer chains possessing a active end depends on various factors including inter alia the specific catalyst composition employed, the type(s) of monomer(s) polymerized, the purity of the ingredients, the temperature or temperature profile employed during polymerization, and the extent of monomer conversion. In most polymer cements prepared according to an aforedescribed process, at least ~20% of the polymer chains possess an active end, although in many embodiments that percentage can be at least ~50% and at least ~80% in some embodiments.

Regardless of the number of such polymer chains, those with active ends can undergo the functionalization reactions summarily described above, a more detailed description of which follows.

One of the two types of functionalizing compounds is heterocyclic nitrile compounds.

The heterocyclic nitrile compounds can contain one or multiple cyano groups. Compounds with a single cyano group can be preferred in some embodiments, although multiple groups leave open the possibility of a single heterocyclic nitrile compound reacting with more than one polymer chain, thereby permitting the resulting radical to couple multiple chains, thereby decreasing cold flow. Use of heterocyclic nitrile compounds with three or more cyano groups likely will be targeted only for special use situations.

The heterocyclic group can contain unsaturation or can be aromatic, and it can be monocyclic or polycyclic.

The ring portion(s) of the heterocyclic group can include one or multiple heteroatoms which are the same or differ. Non-limiting examples of heteroatoms which can constitute a portion of one or more of the ring structures of the heterocyclic group include N, O, B, Si, S, Sn, and P.

Representative examples of N atom-containing heterocyclic groups include 2-pyridyl, 3-pyridyl, 4-pyridyl, pyrazinyl, 2-pyrimidinyl, 4-pyrimidinyl, 5-pyrimidinyl, 3-pyridazinyl, 4-pyridazinyl, N-methyl-2-pyrrolyl, N-methyl-3-pyrrolyl, N-methyl-2-imidazolyl, N-methyl-4-imidazolyl, N-methyl-5-imidazolyl, N-methyl-3-pyrazolyl, N-methyl-4-pyrazolyl, N-methyl-5-pyrazolyl, N-methyl-1,2,3-triazol-4-yl, N-methyl-1,2,3-triazol-5-yl, N-methyl-1,2,4-triazol-3-yl, N-methyl-1,2,4-triazol-5-yl, 1,2,4-triazin-3-yl, 1,2,4-triazin-5-yl, 1,2,4-triazin-6-yl, 1,3,5-triazinyl, N-methyl-2-pyrrolin-2-yl, N-methyl-2-pyrrolin-3-yl, N-methyl-2-pyrrolin-4-yl, N-methyl-2-pyrrolin-5-yl, N-methyl-3-pyrrolin-2-yl, N-methyl-3-pyrrolin-3-yl, N-methyl-2-imidazolin-2-yl, N-methyl-2-imidazolin-4-yl, N-methyl-2-imidazolin-5-yl, N-methyl-2-pyrazolin-3-yl, N-methyl-2-pyrazolin-4-yl, N-methyl-2-pyrazolin-5-yl, 2-quinolyl, 3-quinolyl, 4-quinolyl, 1-isoquinolyl, 3-isoquinolyl, 4-isoquinolyl, N-methylindol-2-yl, N-methylindol-3-yl, N-methylisoindol-1-yl, N-methylisoindol-3-yl, 1-indolizinyl, 2-indolizinyl, 3-indolizinyl, 1-phthalazinyl, 2-quinazolinyl, 4-quinazolinyl, 2-quinoxalinyl, 3-cinnolinyl, 4-cinnolinyl, 1-methylindazol-3-yl, 1,5-naphthyridin-2-yl, 1,5-naphthyridin-3-yl, 1,5-naphthyridin-4-yl, 1,8-naphthyridin-2-yl, 1,8-naphthyridin-3-yl, 1,8-naphthyridin-4-yl, 2-pteridinyl, 4-pteridinyl, 6-pteridinyl, 7-pteridinyl, 1-methylbenzimidazol-2-yl, 6-phenanthridinyl, N-methyl-2-purinyl, N-methyl-6-purinyl, N-methyl-8-purinyl, N-methyl-β-carbolin-1-yl, N-methyl-β-carbolin-3-yl, N-methyl-β-carbolin-4-yl, 9-acridinyl, 1,7-phenanthrolin-2-yl, 1,7-phenanthrolin-3-yl, 1,7-phenanthrolin-4-yl, 1,10-phenanthrolin-2-yl, 1,10-phenanthrolin-3-yl, 1,10-phenanthrolin-4-yl, 4,7-phenanthrolin-1-yl, 4,7-phenanthrolin-2-yl, 4,7-phenanthrolin-3-yl, 1-phenazinyl, 2-phenazinyl, pyrrolidino, and piperidino groups. A non-comprehensive list of N atom-containing heterocyclic nitrile compounds that contain a single cyano group includes 2-pyridinecarbonitrile, 3-pyridinecarbonitrile, 4-pyridinecarbonitrile, pyrazinecarbonitrile, 2-pyrimidinecarbonitrile, 4-pyrimidinecarbonitrile, 5-pyrimidinecarbonitrile, 3-pyridazinecarbonitrile, 4-pyridazinecarbonitrile, N-methyl-2-pyrrolecarbonitrile, N-methyl-3-pyrrolecarbonitrile, N-methyl-2-imidazolecarbonitrile, N-methyl-4-imidazolecarbonitrile, N-methyl-5-imidazolecarbonitrile, N-methyl-3-pyrazolecarbonitrile, N-methyl-4-pyrazolecarbonitrile, N-methyl-5-pyrazolecarbonitrile, N-methyl-1,2,3-triazole-4-carbonitrile, N-methyl-1,2,3-triazole-5-carbonitrile, N-methyl-1,2,4-triazole-3-carbonitrile, N-methyl-1,2,4-triazole-5-carbonitrile, 1,2,4-triazine-3-carbonitrile, 1,2,4-triazine-5-carbonitrile, 1,2,4-triazine-6-carbonitrile, 1,3,5-triazinecarbonitrile, N-methyl-2-pyrroline-2-carbonitrile, N-methyl-2-pyrroline-3-carbonitrile, N-methyl-2-pyrroline-4-carbonitrile, N-methyl-2-pyrroline-5-carbonitrile, N-methyl-3-pyrroline-2-carbonitrile, N-methyl-3-pyrroline-3-carbonitrile, N-methyl-2-imidazoline-2-carbonitrile, N-methyl-2-imidazoline-4-carbonitrile, N-methyl-2-imidazoline-5-carbonitrile, N-methyl-2-pyrazoline-3-carbonitrile, N-methyl-2-pyrazoline-4-carbonitrile, N-methyl-2-pyrazoline-5-carbonitrile, 2-quinolinecarbonitrile, 3-quinolinecarbonitrile, 4-quinolinecarbonitrile, 1-isoquinolinecarbonitrile, 3-isoquinolinecarbonitrile, 4-isoquinolinecarbonitrile, N-methylindole-2-carbonitrile, N-methylindole-3-carbonitrile, N-methylisoindole-1-carbonitrile, N-methylisoindole-3-carbonitrile, 1-indolizinecarbonitrile, 2-indolizinecarbonitrile, 3-indolizinecarbonitrile, 1-phthalazinecarbonitrile, 2-quinazolinecarbonitrile, 4-quinazolinecarbonitrile, 2-quinoxalinecarbonitrile, 3-cinnolinecarbonitrile, 4-cinnolinecarbonitrile, 1-methylindazole-3-carbonitrile, 1,5-naphthyridine-2-carbonitrile, 1,5-naphthyridine-3-carbonitrile, 1,5-naphthyridine-4-carbonitrile, 1,8-naphthyridine-2-carbonitrile, 1,8-naphthyridine-3-carbonitrile, 1,8-naphthyridine-4-carbonitrile, 2-pteridinecarbonitrile, 4-pteridinecarbonitrile, 6-pteridinecarbonitrile, 7-pteridinecarbonitrile, 1-methylbenzimidazole-2-carbonitrile, phenanthridine-6-carbonitrile, N-methyl-2-purinecarbonitrile, N-methyl-6-purinecarbonitrile, N-methyl-8-purinecarbonitrile, N-methyl-β-carboline-1-carbonitrile, N-methyl-β-carboline-3-carbonitrile, N-methyl-β-carboline-4-carbonitrile, 9-acridinecarbonitrile, 1,7-phenanthroline-2-carbonitrile, 1,7-phenanthroline-3-carbonitrile, 1,7-phenanthroline-4-carbonitrile, 1,10-phenanthroline-2-carbonitrile, 1,10-phenanthroline-3-carbonitrile, 1,10-phenanthroline-4-carbonitrile, 4,7-phenanthroline-1-carbonitrile, 4,7-phenanthroline-2-carbonitrile, 4,7-phenanthroline-3-carbonitrile, 1-phenazinecarbonitrile, 2-phenazinecarbonitrile, 1-pyrrolidinecarbonitrile, and 1-piperidinecarbonitrile. From this list, the ordinarily skilled artisan can envision scores of similar compounds containing two or more cyano groups.

Representative examples of O atom-containing heterocyclic groups include 2-furyl, 3-furyl, 2-benzo[b]furyl, 3-benzo[b]furyl, 1-isobenzo[b]furyl, 3-isobenzo[b]furyl, 2-naphtho[2,3-b]furyl, and 3-naphtho[2,3-b]furyl groups. A non-comprehensive list of O atom-containing heterocyclic nitrile compounds that contain a single cyano group includes 2-furonitrile, 3-furonitrile 2-benzo[b]furancarbonitrile, 3-benzo[b]furancarbonitrile, isobenzo[b]furan-1-carbonitrile, isobenzo[b]furan-3-carbonitrile, naphtho[2,3-b]furan-2-carbonitrile, and naphtho[2,3-b]furan-3-carbonitrile. Again, from this list, the ordinarily skilled artisan can envision scores of similar compounds containing two or more cyano groups.

Representative examples of S atom-containing heterocyclic groups include 2-thienyl, 3-thienyl, 2-benzo[b]thienyl, 3-benzo[b]thienyl, 1-isobenzo[b]thienyl, 3-isobenzo[b]thienyl, 2-naphtho[2,3-b]thienyl, and 3-naphtho[2,3-b]thienyl groups. A non-comprehensive list of S atom-containing heterocyclic nitrile compounds that contain a single cyano group includes 2-thiophenecarbonitrile, 3-thiophenecarbonitrile, benzo[b]thiophene-2-carbonitrile, benzo[b]thiophene-3-carbonitrile, isobenzo[b]thiophene-1-carbonitrile, isobenzo[b]thiophene-3-carbonitrile, naphtho[2,3-b]thiophene-2-carbonitrile, and naphtho[2,3-b]thiophene-3-carbonitrile. As before, from this list, the ordinarily skilled artisan can envision scores of similar compounds containing two or more cyano groups.

Representative examples of heterocyclic groups containing two or more distinct heteroatoms include 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,2,3-oxadiazol-4-yl, 1,2,3-oxadiazol-5-yl, 1,3,4-oxadiazol-2-yl, 1,2,3-thiadiazol-4-yl, 1,2,3-thiadiazol-5-yl, 1,3,4-thiadiazol-2-yl, 2-oxazolin-2-yl, 2-oxazolin-4-yl, 2-oxazolin-5-yl, 3-isoxazolinyl, 4-isoxazolinyl, 5-isoxazolinyl, 2-thiazolin-2-yl, 2-thiazolin-4-yl, 2-thiazolin-5-yl, 3-isothiazolinyl, 4-isothiazolinyl, 5-isothiazolinyl, 2-benzothiazolyl, and morpholino groups. A non-comprehensive list of heterocyclic nitrile compounds containing two or more heteroatoms includes 2-oxazolecarbonitrile, 4-oxazolecarbonitrile, 5-oxazolecarbonitrile, 3-isoxazolecarbonitrile, 4-isoxazolecarbonitrile, 5-isoxazolecarbonitrile, 2-thiazolecarbonitrile, 4-thiazolecarbonitrile, 5-thiazolecarbonitrile, 3-isothiazolecarbonitrile, 4-isothiazolecarbonitrile, 5-isothiazolecarbonitrile, 1,2,3-oxadiazole-4-carbonitrile, 1,2,3-oxadiazole-5-carbonitrile, 1,3,4-oxadiazole-2-carbonitrile, 1,2,3-thiadiazole-4-carbonitrile, 1,2,3-thiadiazole-5-carbonitrile, 1,3,4-thiadiazole-2-carbonitrile, 2-oxazoline-2-carbonitrile, 2-oxazoline-4-carbonitrile, 2-oxazoline-5-carbonitrile, 3-isoxazolinecarbonitrile, 4-isoxazolinecarbonitrile, 5-isoxazolinecarbonitrile, 2-thiazoline-2-carbonitrile, 2-thiazoline-4-carbonitrile, 2-thiazoline-5-carbonitrile, 3-isothiazolinecarbonitrile, 4-isothiazolinecarbonitrile, 5-isothiazolinecarbonitrile, benzothiazole-2-carbonitrile, and 4-morpholinecarbonitrile. Once again, from this list, the ordinarily skilled artisan can envision scores of similar compounds containing two or more cyano groups.

With respect to those heterocyclic nitrile compounds where the cyano group(s) is or are indirectly bonded to the heterocyclic moiety, potentially useful divalent linking groups include substituted or unsubstituted hydrocarbylene groups such as, but not limited to, (cyclo)alkylene, (cyclo)alkenylene and arylene groups. (In each case, substituted embodiments involve one or more H atoms of an unsubstituted hydrocarbylene group having been replaced by a substituent such as an alkyl group and/or one or more heteroatoms such as, but not limited to, N, O, B, Si, S, Sn, and P.) Each such group can contain from 1 carbon atom, or the appropriate minimum number of carbon atoms to form the group, up to 20 carbon atoms. Representative examples of heterocyclic nitrile compounds where a cyano group is indirectly bonded to the heterocyclic group include 2-pyridylacetonitrile, 3-pyridylacetonitrile, 4-pyridylacetonitrile, pyrazinylacetonitrile, 2-pyrimidinylacetonitrile, 4-pyrimidinylacetonitrile, 5-pyrimidinylacetonitrile, 3-pyridazinylacetonitrile, 4-pyridazinylacetonitrile, N-methyl-2-pyrrolylacetonitrile, N-methyl-3-pyrrolylacetonitrile, N-methyl-2-imidazolylacetonitrile, N-methyl-4-imidazolylacetonitrile, N-methyl-5-imidazolylacetonitrile, N-methyl-3-pyrazolylacetonitrile, N-methyl-4-pyrazolylacetonitrile, N-methyl-5-pyrazolylacetonitrile, 1,3,5-triazinylacetonitrile, 2-quinolylacetonitrile, 3-quinolylacetonitrile, 4-quinolylacetonitrile, 1-isoquinolylacetonitrile, 3-isoquinolylacetonitrile, 4-isoquinolylacetonitrile, 1-indolizinylacetonitrile, 2-indolizinylacetonitrile, 3-indolizinylacetonitrile, 1-phthalazinylacetonitrile, 2-quinazolinylacetonitrile, 4-quinazolinylacetonitrile, 2-quinoxalinylacetonitrile, 3-cinnolinylacetonitrile, 4-cinnolinylacetonitrile, 2-pteridinylacetonitrile, 4-pteridinylacetonitrile, 6-pteridinylacetonitrile, 7-pteridinylacetonitrile, 6-phenanthridinylacetonitrile, N-methyl-2-purinylacetonitrile, N-methyl-6-purinylacetonitrile, N-methyl-8-purinylacetonitrile, 9-acridinylacetonitrile, 1,7-phenanthrolin-2-ylacetonitrile, 1,7-phenanthrolin-3-ylacetonitrile, 1,7-phenanthrolin-4-ylacetonitrile, 1,10-phenanthrolin-2-ylacetonitrile, 1,10-phenanthrolin-3-ylacetonitrile, 1,10-phenanthrolin-4-ylacetonitrile, 4,7-phenanthrolin-1-ylacetonitrile, 4,7-phenanthrolin-2-ylacetonitrile, 4,7-phenanthrolin-3-ylacetonitrile, 1-phenazinylacetonitrile, 2-phenazinylacetonitrile, pyrrolidinoacetonitrile, piperidinoacetonitrile, 2-furylacetonitrile, 3-furylacetonitrile, 2-benzo[b]furylacetonitrile, 3-benzo[b]furylacetonitrile, 1-isobenzo[b]furylacetonitrile, 3-isobenzo[b]furylacetonitrile, 2-naphtho[2,3-b]furylacetonitrile, 3-naphtho[2,3-b]furylacetonitrile, 2-thienylacetonitrile, 3-thienylacetonitrile, 2-benzo[b]thienylacetonitrile, 3-benzo[b]thienylacetonitrile, 1-isobenzo[b]thienylacetonitrile, 3-isobenzo[b]thienylacetonitrile, 2-naphtho[2,3-b]thienylacetonitrile, 3-naphtho[2,3-b]thienylacetonitrile, 2-oxazolylacetonitrile, 4-oxazolylacetonitrile, 5-oxazolylacetonitrile, 3-isoxazolylacetonitrile, 4-isoxazolylacetonitrile, 5-isoxazolylacetonitrile, 2-thiazolylacetonitrile, 4-thiazolylacetonitrile, 5-thiazolylacetonitrile, 3-isothiazolylacetonitrile, 4-isothiazolylacetonitrile, 5-isothiazolylacetonitrile, 3-isoxazolinylacetonitrile, 4-isoxazolinylacetonitrile, 5-isoxazolinylacetonitrile, 3-isothiazolinylacetonitrile, 4-isothiazolinylacetonitrile, 5-isothiazolinylacetonitrile, 2-benzothiazolylacetonitrile, and morpholinoacetonitrile.

As suggested repeatedly above, the number of heterocyclic nitrile compounds that have two or more cyano groups is extraordinarily high. The following is a very abbreviated list of representative examples: 2,3-pyridinediacetonitrile, 2,4-pyridinediacetonitrile, 2,5-pyridinediacetonitrile, 2,6-pyridinediacetonitrile, 3,4-pyridinediacetonitrile, 2,4-pyrimidinediacetonitrile, 2,5-pyrimidinediacetonitrile, 4,5-pyrimidinediacetonitrile, 4,6-pyrimidinediacetonitrile, 2,3-pyrazinediacetonitrile, 2,5-pyrazinediacetonitrile, 2,6-pyrazinediacetonitrile, 2,3-furandiacetonitrile, 2,4-furandiacetonitrile, 2,5-furandiacetonitrile, 2,3-thiophenediacetonitrile, 2,4-thiophenediacetonitrile, 2,5-thiophenediacetonitrile, N-methyl-2,3-pyrrolediacetonitrile, N-methyl-2,4-pyrrolediacetonitrile, N-methyl-2,5-pyrrolediacetonitrile, 1,3,5-triazine-2,4-diacetonitrile, 1,2,4-triazine-3,5-diacetonitrile, 1,2,4-triazine-3,6-diacetonitrile, 2,3,4-pyridinetriacetonitrile, 2,3,5-pyridinetriacetonitrile, 2,3,6-pyridinetriacetonitrile, 2,4,5-pyridinetriacetonitrile, 2,4,6- pyridinetriacetonitrile, 3,4,5-pyridinetriacetonitrile, 2,4,5-pyrimidinetriacetonitrile, 2,4,6-pyrimidinetriacetonitrile, 4,5,6-pyrimidinetriacetonitrile, pyrazinetriacetonitrile, 2,3,4-furantriacetonitrile, 2,3,5-furantriacetonitrile, 2,3,4-thiophenetriacetonitrile, 2,3,5-thiophenetriacetonitrile, N-methyl-2,3,4-pyrroletriacetonitrile, N-methyl-2,3,5-pyrroletriacetonitrile, 1,3,5-triazine-2,4,6-triacetonitrile, and 1,2,4-triazine-3,5,6-triacetonitrile.

The second of the two types of functionalizing compounds is an aryl group having at least two directly bonded $OG_p$ substituents, where $G_p$ is defined as above, and a functional group which is reactive toward reactive (pseudoliving) polymer chain termini.

Using a formula I-type compound, which employs a phenyl group as an exemplary aryl group, terminal functionality of the type shown in the following general formula can be provided to the polymer:

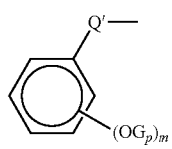

(II)

with Q' being the radical of Q (after reaction with the active sites of a reactive polymer), $G_p$ is a protecting group, and m is an integer of from 2 to 5 inclusive.

Each of general formulae (I) and (II) employs a phenyl ring, which is the simplest aryl ring. This choice is made for ease of depiction and understanding and, from these, the ordinarily skilled artisan can envision numerous polycyclic aromatic compounds including, but not limited to, naphthalene, anthracene, tetracene, and the like, as well as substituted versions of each. Most of the remaining discussion focuses on those species where the aryl group is a phenyl group.

Formula I encompasses a large number of specific compounds. The paragraphs that follow discuss each of the variables utilized in that formula separately and provide certain exemplary species falling within the generic formula.

As noted previously, m can be any integer from 2 to 5 inclusive; where an aryl group other than phenyl is employed, the number of $OG_p$ functionalities can be greater than 5, although at least one always will be present. Relative to the Q substituent, each $OG_p$ moiety can be located ortho, meta, or para on the ring to which Q is bonded or can be bonded to a C atom from another ring of the aryl group. The $OG_p$ moieties can be bonded to non-adjacent or adjacent aryl C atoms; the latter constitutes one type of preferred embodiment. When three or more $OG_p$ moieties are present, two of them can be substituents of one ring (optionally being bonded to adjacent C atoms) with the other(s) being substituent(s) of other ring(s). In one embodiment, two $OG_p$ moieties can be at the 3 and 4 positions of the same ring within the aryl group, preferably a phenyl group. Where the aryl group is other than a phenyl group and includes more than one $OG_p$ moiety on more than one ring, at least two of the $OG_p$ moieties preferably are at least somewhat proximate, i.e., directly bonded to ring C atoms that are separated by no more than 4, preferably 3, and even more preferably 2, other ring atoms.

The $G_p$ moieties of the $OG_p$ functionalities ensure that no active hydrogen atoms are present in the second type of functionalizing compound. Although each $G_p$ moiety need not be identical, ease and simplicity typically result in a single type of $G_p$ moiety being used in a given compound.

Unless a particular $G_p$ constitutes a moiety that is capable of enhancing the polymer's interactivity with particulate filler (as evidenced by, for example, reduced tan δ values at 50° C.), it preferably also is capable of being hydrolyzed. Trihydrocarbylsilyl groups are a non-limiting example of the type of $G_p$ moiety that can serve these dual purposes; such moieties can be provided by reacting the hydroxyl substituent(s) of the aryl group with a trihydrocarbylsilyl halide, preferably a trialkylsilyl halide. In addition to trihydrocarbylsilyl moieties, other potentially useful $G_p$ moieties include but not limited to benzyl, t-butyl, alkoxyalkyl (e.g., $CH_3OCH_2$—), tetrahydropyranyl, allyl, sulfonamide, and bulky esters (e.g., pivalates).

The processing steps described below (including quenching) can be sufficient to hydrolyze at least some of the $G_p$ moieties, thereby providing one or more hydroxyl substituents to the terminal aryl group functionality. Alternatively, a separate reaction step designed to promote extensive, preferably complete, hydrolysis can be employed; from the exemplary technique employed in several of the examples below, the ordinarily skilled artisan can envision other potentially effective reactions. Further, the ordinarily skilled artisan understands that $OG_p$ or OH substituents may undergo further reaction during processing and/or compounding with one or more types of particulate fillers (described below).

An active terminus of the polymer can react with the Q substituent of the compound so as to provide a polymer having as a terminal moiety the radical of a compound that includes an aryl group having at least two directly bonded $OG_p$ substituents. The manner in which the terminal moiety and polymer are connected depends on the identity of the Q group. By way of non-limiting example, a formula I-type compound where Q is a nitrile group can provide a polymer of the general formula

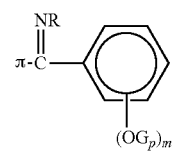

(III)

where $G_p$ and m are defined as above, R is a H atom or a group (e.g., OH, alkyl, etc.) that results from processing of the polymer, and π is a polymer chain, typically a polymer chain that includes mer derived from one or more types of polyenes.

Non-limiting examples of potentially useful reactive functional groups include ketones, quinones, aldehydes, amides, iso(thio)cyanates, epoxides, imines, amino(thio)ketones, azines, hydrazones, oximes, nitro, nitriles, hydrobenzamide, and acid anhydrides, examples of which can be found in, for example, U.S. Pat. Nos. 4,906,706, 4,990,573, 5,064,910, 5,567,784, 5,844,050, 6,838,526, 6,977,281, 6,992,147, 7,671,136, 7,750,087, 8,946,355, etc. Non-limiting examples of useful Q substituents and the Q' moieties resulting therefrom, include but are not limited to

| Q | Resulting Q' |
|---|---|
| oximes | >CH—NH—OR, where R is defined as above |
| imines | >CH—NHR', where R' is a substituted or unsubstituted hydrocarbyl group, typically an alkyl or aryl group |

| Q | Resulting Q' |
|---|---|
| hydrazones | >CH—NH—$R_N$, where $R_N$ is a cyclic group bonded to the N atom of the secondary amine through a ring N atom bonded to two C atoms |
| nitriles | >C=NR, where R is defined as above |
| azines | >CH—NH—N=$CR^1$ or >CH—N=$NCHR^1$, where $R^1$ is a substituted or unsubstituted hydrocarbyl group, preferably an aryl group that includes at least one $OG_p$ or OH substituent |

A variety of considerations including cost and availability make aldehydes a preferred type of reactive functional group.

Any of the aforedescribed heterocyclic nitrile compounds can be used with any of the second functionalizing compounds. In some embodiments, more than one species of each type can be employed in the functionalizing reactions.

The amounts of the two types of functionalizing compounds added to the polymers with reactive termini depend on various factors including the type and amount of catalyst composition used to initiate the polymerization and the desired degree of functionalization. The two types of functionalizing compounds typically need not be added in significant excess, although typically a slight molar excess of the functionalizing compounds relative to equivalents of pseudo-living termini (in coordination catalyst polymerizations) is employed. Where a lanthanide-based catalyst composition is used to prepare reactive polymers, the amounts of the functionalizing compounds employed can be described with reference to the lanthanide metal of the lanthanide compound, for example, the molar ratio of the total amounts of functionalizing compounds to the lanthanide metal can be from ~1:1 to ~200:1, from ~5:1 to ~150:1, from ~10:1 to ~100:1, or from ~25:1 to ~75:1.

The relative amounts of the two types of functionalizing compounds also can vary significantly. The molar ratio of the two types of compounds can range from 1:4 to 4:1, preferably from 1:3 to 3:1, more preferably from 1:2 to 2:1, even more preferably from 2:3 to 3:2, yet still more preferably from 3:4 to 4:3, and most preferably from 4:5 to 5:4.

Terminal functionalities can be provided to the reactive polymer chains while they remain in the polymerization vessel or, if desired, the polymer cement can be transferred to another vessel prior to reaction. The functionalization reactions can be undertaken within 30 minutes, commonly within 5 minutes, and often within one minute after peak polymerization temperature has been reached. (Minimizing the amount of time between completion of polymerization and functionalization might lessen the number of polymer chains that become unreactive through any of a variety of processes including termination, coupling, etc.)

The functionalization reactions can be initiated merely by introducing one or both of the two types of functionalizing compounds to the polymer chains or vice versa. In some embodiments, both types of functionalizing compounds are added simultaneously (i.e., a blend of compounds is prepared and introduced to the reactive polymer chains); in other embodiments, one of the two types of functionalizing can be introduced and allowed to react with some of the reactive polymer chains and thereafter the other type of functionalizing compound can be added to react with some or all of the remainder of the chains.

Reaction of the two types of functionalizing compounds with the reactive polymer chains can be performed from sub-ambient temperatures (e.g., after storage of the polymer cement) to elevated temperatures, particularly those which polymer cements often exhibit after the end of a batch, semi-batch or continuous polymerization process. While certainly not required, the reactions can be performed at even higher temperatures, e.g., up to ~100° C., up to 120° C., up to 130° C. or even up to 150° C.

The time required for completing the reactions between the functionalizing compounds and the reactive polymers varies greatly depending on factors including inter alia the type and amount of the catalyst composition used to prepare the reactive polymer, the type and amount of the functionalizing compounds, and the temperature at which the functionalization reaction is conducted. Reaction between the functionalizing compounds and the reactive polymer chains typically can be completed in 10-60 minutes. (In situations involving sequential addition of functionalizing compounds, this amount of time can double.)

Quenching, if desired, can be conducted by stirring the polymer and an active hydrogen-containing compound, such as an alcohol, water or an acid, for up to about 120 minutes at temperatures of from ~25° to ~150° C. This can inactivate any residual reactive polymer chains as well as components of the catalyst composition. An antioxidant often is added along with, before, or after the addition of the quenching agent.

Solvent can be removed from the (quenched) polymer cement by conventional techniques such as drum drying, extruder drying, vacuum drying or the like, which may be combined with coagulation with water, alcohol or steam and/or thermal desolventization. If coagulation is performed, oven drying may be desirable.

Polymers such as those described above can display particularly advantageous properties when compounded with, inter alia, reinforcing fillers such as carbon black and silica. They can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Rubber compositions typically are filled to a volume fraction, which is the total volume of filler(s) added divided by the total volume of the elastomeric stock, of ~25%; accordingly, typical (combined) amounts of reinforcing fillers is ~30 to 100 phr.

One class of useful particulate fillers is carbon black. Potentially useful carbon black materials include, but not limited to, furnace blacks, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least ~35 m$^2$/g, are preferred; surface area values can be determined by ASTM D-1765. The carbon blacks may be in pelletized form or an unpelletized flocculent mass, although unpelletized carbon black can be preferred for use in certain mixers.

The amount of carbon black utilized can be up to ~50 phr, with ~5 to ~40 phr being typical. For certain oil-extended formulations, the amount of carbon black has been even higher, e.g., on the order of ~80 phr.

Amorphous silica (SiO$_2$) also commonly is used as a filler. Silicas typically are produced by a chemical reaction in water, from which they are precipitated as ultrafine, spherical particles which strongly associate into aggregates and, in turn, combine less strongly into agglomerates. Surface area gives a reliable measure of the reinforcing character of different silicas, with BET (see; Brunauer et al., *J. Am. Chem. Soc.*, vol. 60, p. 309 et seq.) surface areas of less than 450 m$^2$/g, commonly between ~32 to ~400 m$^2$/g, and typically ~100 to ~250 m$^2$/g, generally being considered useful. Commercial suppliers of silica include PPG Industries, Inc. (Pittsburgh, Pa.), Grace Davison (Baltimore, Md.), Degussa Corp. (Parsippany, N.J.), Rhodia Silica Systems (Cranbury, N.J.), and J.M. Huber Corp. (Edison, N.J.).

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the compound. Coupling agents generally include a functional group capable of bonding physically and/or chemically with a group on the surface of the silica filler (e.g., surface silanol groups), a hydrocarbon group linkage, and a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes with the appropriate types of functional groups. Addition of a processing aid can be used to reduce the amount of silane employed; see, e.g., U.S. Pat. No. 6,525,118 for a description of fatty acid esters of sugars used as processing aids.

Silica commonly is employed in amounts of up to ~100 phr, typically from ~5 to ~80 phr. The useful upper range is limited by the high viscosity that such fillers can impart. When carbon black also is used, the amount of silica can be decreased to as low as ~1 phr; as the amount of silica decreases, lesser amounts of the processing aids, plus silane if any, can be employed.

Additional fillers useful as processing aids include mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to about 40 phr, typically up to about 20 phr.

Coupling agents are compounds which include a functional group capable of bonding physically and/or chemically with a group on the surface of the silica filler (e.g., surface silanol groups) and a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the types of functionalities mentioned above. An exemplary coupling agent is bis[3-(triethoxysilyl)-propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

One or more non-conventional fillers having relatively high interfacial free energies, i.e., surface free energy in water values ($\gamma_{pl}$) can be used in conjunction with or in place of carbon black and/or silica. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 2×, at least 3×, at least 4×, at least 5×, at least 6×, at least 7×, at least 8×, at least 9× or even at least 10×) of the $\gamma_{pl}$ value for amorphous silica; in absolute terms such as, e.g., at least ~300, at least ~400, at least ~500, at least ~600, at least ~700, at least ~750, at least ~1000, at least ~1500, and at least ~2000 mJ/m$^2$, and various combinations of the foregoing minimum values.

Non-limiting examples of naturally occurring materials with relatively high interfacial free energies include F-apatite, goethite, hematite, zincite, tenorite, gibbsite, quartz, kaolinite, all forms of pyrite, and the like. Certain synthetic complex oxides also can exhibit this type of high interfacial free energy.

The foregoing types of materials typically are more dense than either carbon black or amorphous silica; thus, replacing a particular mass of carbon black or silica with an equal mass of a non-conventional filler typically will result in a much smaller volume of overall filler being present in a given compound. Accordingly, replacement typically is made on an equal volume, as opposed to equal weight, basis.

Generally, ~5 to ~60% of one or more conventional particulate filler materials can be replaced with an approximately equivalent (~0.8× to ~1.2×) volume of non-conventional filler particles. In certain embodiments, replacing ~10 to ~58% of the conventional particulate filler material(s) with an approximately equivalent (~0.85× to ~1.15×) volume of other filler particles is sufficient while, in other embodiments, replacing ~15 to ~55% of the conventional particulate filler material(s) with an approximately equivalent (~0.9× to ~1.1×) volume of other filler particles is adequate.

Non-conventional filler particles generally can be of approximately the same size as the conventional fillers employed in compounds.

Other conventional rubber additives also can be added. These include, for example, process oils, plasticizers, antidegradants such as antioxidants and antiozonants, curing agents and the like.

All ingredients can be mixed using standard equipment such as, e.g., Banbury or Brabender mixers. Typically, mixing occurs in two or more stages. During the first stage (often referred to as the masterbatch stage), mixing typically is begun at temperatures of 120° to 130° C. and increases until a so-called drop temperature, typically somewhere near 165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C.

The $T_g$ of a polymer can be determined by heat capacity measurements using a properly calibrated DSC unit, scanning over an appropriate temperature range, or by a viscoelastic technique, e.g., evaluating the temperature dependence of G".

All values herein in the form of percentages are weight percentages (w/w) unless the surrounding text explicitly indicates a contrary intention.

All patents and published patent applications mentioned previously are incorporated herein by reference.

Various embodiments of the present invention have been provided by way of example and not limitation. As evident from the foregoing description, general preferences regarding features, ranges, numerical limitations and embodiments are to the extent feasible, as long as not interfering or incompatible, envisioned as being capable of being combined with other such generally preferred features, ranges, numerical limitations and embodiments.

The following non-limiting, illustrative examples provide details regarding exemplary conditions and materials that can be useful in the practice of the present invention. These examples describe functionalization with a single heterocyclic nitrile compound and a single compound that has an aryl group with at least two directly bonded $OG_p$ substituents, a choice that permits direct comparison against functionalization using just each of the two functionalizing compounds in isolation. In view of these examples and the foregoing detailed description, an ordinarily skilled artisan can perform thousands of similar reactions. The number of examples, as well as the choice of exemplary functionalizing compounds, should not be read as limiting the breadth of the invention, which instead is defined solely by the appended claims.

EXAMPLES

Examples 1-4 describe syntheses of non-functionalized, single functionalized and mixed functionalized polymers. In these syntheses, the amounts set forth below in Table 1 were employed (with the butadiene solution being 21.5% (w/w) in hexane):

TABLE 1

Amounts of materials employed in polymerizations

| Monomer and solvent | |
|---|---|
| hexane (kg) | 1.20 |
| 1,3-butadiene solution (kg) | 2.88 |
| Catalyst ingredients | |
| 4.32M methylaluminoxane in toluene (mL) | 7.17 |
| 1,3-butadiene solution (kg) | 1.55 |
| 0.508M neodymium versatate in cyclohexane (mL) | 0.61 |
| 1.03M diisobutylaluminum hydride in hexane (mL) | 6.31 |
| 1.07M diethylaluminum chloride in hexane (mL) | 1.16 |

Examples 1-4: Synthesis of Polymers

In a dry reactor (~7.6 L, 2 gallons) purged with $N_2$ was provided the monomer and solvent, with the resulting mixture being maintained at 22° C.

A preformed catalyst composition was prepared by mixing the catalyst ingredients from Table 1 in a bottle. After 20 minutes of aging, the resulting composition was added to the aforedescribed reactor. The reactor jacket was set to 65° C.

About 60 minutes after introduction of catalyst, the polymer cement was allowed to cool to room temperature.

Three portions of the cement, each ~400 g, were dropped into separate clean, dry, $N_2$-purged glass bottles. The remainder of the cement was dropped into 12 L isopropanol containing 5 g 2,6-di-tert-butyl-4-methylphenol (BHT) and drum dried. This non-functionalized control polymer is designated Example 1 below.

To one of the bottles described in the foregoing paragraph was added 2.25 mL of 0.8 M 2-cyanopyridine, obtained from Sigma-Aldrich Co. (St. Louis, Mo.). This comparative functionalized polymer is designated Example 2 below.

To another of the bottles described above was added 1.80 mL of 1.0 M 3,4-bis(trimethylsiloxy)benzaldehyde, prepared in accordance with the process described in Example 21 of U.S. Pat. No. 8,871,871. This comparative functionalized polymer is designated Example 3 below.

To the third of the bottle described above was added 1.13 mL of 0.8 M 2-cyano-pyridine and 0.90 mL of 1.0 M 3,4-bis(trimethylsiloxy)benzaldehyde. This functionalized polymer is designated Example 4 below.

(The target molar ratio of functionalizing compound(s)-to-Nd for each of Examples 2-4 was 60:1.)

Each of the three bottles was tumbled for ~30 minutes in a water bath maintained at 65° C. before their contents were separately quenched with 3 mL of a 12% (w/w) BHT in isopropanol solution.

Solvent was removed from each of the four polymer cements via steam desolventization, and each resulting polymer was separately drum dried.

IR spectroscopy indicated that the polymer microstructure was 94.4% cis 1,4-linkage, 5.1% trans 1,4-linkage, and 0.5% 1,2-linkage.

Characteristics of the Examples 1-4 polymers are summarized below in Table 2. Molecular weight data was obtained via GPC (as described previously). Gum Mooney viscosity ($ML_{1+4}$) values were determined at the noted temperature with an Alpha Technologies™ Mooney viscometer (large rotor) using a one-minute warm-up time and a four-minute running time. The "$t_{80}$" values are the times needed to reach a viscosity 80% greater than minimum.

TABLE 2

Properties of polymers from Examples 1-4

|  | 1 (control) | 2 (comp.) | 3 (comp.) | 4 |
|---|---|---|---|---|
| $M_n$ (kg/mol) | 117 | 113 | 130 | 126 |
| $M_w/M_n$ | 1.98 | 2.17 | 1.94 | 2.10 |
| $M_p$ | 177 | 183 | 177 | 169 |
| gum Mooney, $ML_{1+4}$ @ 100° C. | 36.9 | 52.8 | 77.2 | 87.0 |
| $t_{80}$ (seconds) | 1.7 | 2.5 | 4.4 | 5.4 |

Examples 5-8: Preparation and Testing of Filled Compositions

Filled compositions using the polymers from Examples 1-4 were made according to the formulation shown in Table 3 below. These are designated as, respectively, Examples 5-8.

Each filled composition (compound) was cured for ~15 minutes at 171° C. Results of physical testing on these vulcanizates are compiled in Table 4 below. Data corresponding to "Bound rubber" were determined using the procedure described by J. J. Brennan et al., *Rubber Chem. and Tech.*, 40, 817 (1967). Tensile mechanical properties were determined using the standard procedure described in ASTM-D412; Payne effect ($\Delta G'$, i.e., the difference between G' at 0.25% strain and at 14% strain) and hysteresis (tan δ) data were obtained from dynamic experiments conducted at 60° C. and 10 Hz, from 0.25% to 14% strain. With respect to tensile properties, $M_{300}$ is modulus at 300% elongation, $T_b$ is tensile strength at break, and $E_b$ is percent elongation at break.

TABLE 3

Composition for filled compounds

|  | Amount (phr) |
|---|---|
| synthesized cis-1,4-polybutadiene | 40 |
| natural rubber | 60 |
| carbon black | 44 |
| resin | 1.0 |
| wax | 1.0 |
| stearic acid | 2.0 |
| antioxidant | 2.3 |
| ZnO | 3.5 |
| accelerators | 1.5 |
| retarder | 0.1 |
| sulfur | 1.1 |
| Total | 156.5 |

TABLE 4

Compound and vulcanizate properties

|  | 5 (control) | 6 (comp.) | 7 (comp.) | 8 |
|---|---|---|---|---|
| synthetic polymer (example no.) | 1 | 2 | 3 | 4 |
| Bound rubber (%) | 37.6 | 39.0 | 46.8 | 41.6 |
| Compound RPA G' @ 130° C. (kPa) | 77.4 | 85.0 | 100.9 | 99.0 |

TABLE 4-continued

Compound and vulcanizate properties

|  | 5 (control) | 6 (comp.) | 7 (comp.) | 8 |
|---|---|---|---|---|
| Tensile @ 23° C. (final, unaged) | | | | |
| $M_{300}$ (MPa) | 18.21 | 18.32 | 18.92 | 19.39 |
| $T_b$ (MPa) | 23.6 | 26.0 | 20.7 | 24.4 |
| $E_b$ (%) | 381 | 406 | 329 | 368 |
| Strain sweep (60° C., 10 Hz, final) | | | | |
| 3% tan δ | 0.1338 | 0.1149 | 0.1126 | 0.1047 |
| 10% tan δ | 0.1222 | 0.1058 | 0.1030 | 0.0955 |
| Δ tan δ | 0.0637 | 0.0519 | 0.0513 | 0.0456 |
| $\Delta G'$ (MPa) | 1.93 | 1.51 | 1.57 | 1.36 |
| Torque Lambourn Wear Index | 100 | 97 | 103 | 146 |

If the Table 4 data for strain sweep at 10% tan δ is plotted as a function of compound RPA G' at 130° C., one sees that Example 8 lies farthest to the lower right portion of the graph, which shows desirable hysteresis (rolling resistance) properties.

Similarly, if the Table 4 data for torque Lambourn wear index is plotted as a function of strain sweep at 10% tan δ, one sees that Example 8 lies farthest to the upper left portion of the graph, which shows desirable wear resistance properties.

Thus, the composition of Example 8 exhibits the desirable synergistic effect of reduced hysteresis and higher wear resistance.

That which is claimed is:

1. A process for providing terminally functionalized polymers, said process comprising:
 a) providing a solution that comprises
  1) ethylenically unsaturated monomers that comprise at least one type of polyene, and
  2) a catalyst composition;
 b) permitting said catalyst composition to polymerize at least a portion of said ethylenically unsaturated monomers so as to provide polymers having active termini; and
 c) introducing at least a portion of said polymers to
  1) a heterocyclic nitrile and permitting said heterocyclic nitrile to functionalize the termini of some of said polymers, and
  2) an aryl compound that comprises (1) at least two directly bonded $OG_p$ substituents, where $G_p$ is a protecting group, and (2) a substituent that can react with an active polymer terminus, and permitting said aryl compound to functionalize the termini of some of said polymers,
thereby providing said terminally functionalized polymers.

2. The process of claim 1 wherein one of said heterocyclic nitrile and said aryl compound is introduced to said polymers after the other of said heterocyclic nitrile and said aryl compound has reacted with a portion of said polymers.

3. The process of claim 1 wherein said heterocyclic nitrile and said aryl compound are permitted to functionalize said polymers contemporaneously.

4. The process of claim 1 wherein said catalyst composition comprises a compound or complex that comprises a transition metal atom.

5. The process of claim 4 wherein said at least one type of polyene comprises or is a conjugated diene.

6. The process of claim 5 wherein said polymers comprise cis-1,4-polydiene.

7. The process of claim 1 wherein said catalyst composition comprises a compound or complex that comprises a lanthanide series metal atom.

8. The process of claim 7 wherein said catalyst composition is prepared from one of the following combinations of ingredients:
(a) a lanthanide compound, an alkylating agent and a halogen-containing compound,
(b) a halogenated lanthanide compound and an alkylating agent,
(c) a lanthanide compound and a halogenated alkylating agent,
(d) a lanthanide compound and an aluminoxane; and
(e) a lanthanide compound, an alkylating agent, and a non-coordinating anion or precursor thereof.

9. The process of claim 7 wherein said at least one type of polyene comprises or is a conjugated diene.

10. The process of claim 9 wherein said polymers comprise cis-1,4-polydiene.

11. The process of claim 1 wherein said the ring portion of said heterocyclic nitrile comprises an N atom.

12. The process of claim 11 wherein the ring portion constitutes pyridine.

13. The process of claim 12 wherein said heterocyclic nitrile is 2-cyanopyridine.

14. The process of claim 1 wherein the ring portion of said aryl compound is a phenyl group.

15. The process of claim 14 wherein said phenyl group has two directly bonded $OG_p$ substituents.

16. The process of claim 15 wherein said two $OG_p$ substituents are bonded to adjacent ring C atoms of said phenyl group.

17. The process of claim 14 wherein said aryl compound has the general formula

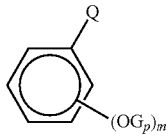

where
Q is a substituent that can react with an active polymer terminus,
each $G_p$ independently is a protecting group selected from trihydrocarbylsilyl, benzyl, t-butyl, alkoxyalkyl, tetrahydropyranyl, allyl, sulfonamide, and pivalates, and
m is an integer of from 2 to 5 inclusive.

18. The process of claim 17 wherein Q is an aldehyde group.

19. The process of claim 18 wherein said aryl compound is 3,4-bis(tri-methylsiloxy)benzaldehyde.

20. A method for providing terminally functionalized polymers, said process comprising:
a) providing a solution that comprises
1) ethylenically unsaturated monomers that comprise 1,3-butadiene, and
2) a catalyst composition prepared from one of the following combinations of ingredients:
(a) a lanthanide compound, an alkylating agent and a halogen-containing compound,
(b) a halogenated lanthanide compound and an alkylating agent,
(c) a lanthanide compound and a halogenated alkylating agent,
(d) a lanthanide compound and an aluminoxane, and
(e) a lanthanide compound, an alkylating agent, and a non-coordinating anion or precursor thereof;
b) permitting said catalyst composition to polymerize at least a portion of said ethylenically unsaturated monomers so as to provide polymers having active termini, said polymers comprising cis-1,4-polybutadiene; and
c) introducing at least a portion of said cis-1,4-polybutadiene chains to
1) 2-cyanopyridine and permitting said 2-cyanopyridine to provide a heterocyclic moiety at the termini of some of said cis-1,4-polybutadiene chains, and
2) a phenyl compound having the general formula

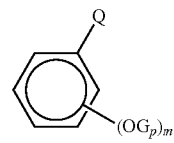

where
Q is a substituent that can react with an active polymer terminus,
each $G_p$ independently is a protecting group selected from trihydrocarbylsilyl, benzyl, t-butyl, alkoxyalkyl, tetrahydropyranyl, allyl, sulfonamide, and pivalates, and
m is an integer of from 2 to 5 inclusive,
and permitting said phenyl compound to functionalize some of said cis-1,4-polybutadience chains; and
d) allowing or causing said $G_p$ protecting groups to hydrolyze so as to yield hydroxyl groups,
thereby providing said terminally functionalized polymers.

* * * * *